(12) United States Patent
Williams et al.

(10) Patent No.: US 10,977,035 B2
(45) Date of Patent: Apr. 13, 2021

(54) ATOMIC MEMORY OPERATION HAVING SELECTABLE LOCATION OF PERFORMANCE

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 16/278,267

(22) Filed: Feb. 18, 2019

(65) Prior Publication Data
US 2020/0264875 A1 Aug. 20, 2020

(51) Int. Cl.
*G06F 9/30* (2018.01)
*G06F 12/084* (2016.01)
*G06F 12/0815* (2016.01)

(52) U.S. Cl.
CPC .......... *G06F 9/3004* (2013.01); *G06F 9/3001* (2013.01); *G06F 12/084* (2013.01); *G06F 12/0815* (2013.01)

(58) Field of Classification Search
CPC ... G06F 9/3004; G06F 9/3001; G06F 12/0815
See application file for complete search history.

(56) References Cited

U.S. PATENT DOCUMENTS

| 8,959,292 | B1 | 2/2015 | Ahn et al. |
| 9,250,914 | B2 | 2/2016 | Hughes et al. |
| 9,384,064 | B2 | 7/2016 | Steinmacher-Burow |
| 9,513,976 | B2 | 12/2016 | Golliver |
| 9,715,391 | B2 | 7/2017 | O'Sullivan |
| 2012/0117317 | A1 | 5/2012 | Sheffler et al. |
| 2014/0136799 | A1 | 5/2014 | Fortin |
| 2015/0089145 | A1* | 3/2015 | Steinmacher-Burow ............ G06F 9/526 711/130 |
| 2017/0269948 | A1* | 9/2017 | Gschwind ............ G06F 9/44505 |
| 2018/0267891 | A1 | 9/2018 | Sheffler et al. |
| 2019/0004810 | A1* | 1/2019 | Jayasimha ............ G06F 9/3004 |

* cited by examiner

*Primary Examiner* — Michelle T Bechtold
(74) *Attorney, Agent, or Firm* — David Quinn; Brian F Russell (57) ABSTRACT

A data processing system includes at least one processing unit and a memory controller coupled to a system memory. The processing unit includes a processor core and a cache memory including an arithmetic logic unit (ALU). The cache memory is configured to receive, from the processor core, an atomic memory operation (AMO) request specifying a target address of a data granule to be updated by an AMO and a location indication. Based on the location indication having a first setting, the AMO indicated by the AMO request is performed in the cache memory utilizing the ALU. Based on the location indication having a different second setting, the cache memory issues the AMO request to the memory controller to cause the AMO to be performed at the memory controller.

13 Claims, 7 Drawing Sheets

ATOMIC MEMORY OPERATION HAVING SELECTABLE LOCATION OF PERFORMANCE

BACKGROUND

The present invention relates to data processing and, more particularly, to atomic memory operations in a data processing system. Still more particularly, the present invention relates to selectively performing an atomic memory operation in-cache or at a memory controller of a system memory of a data processing system.

A conventional symmetric multiprocessor (SMP) computer system, such as a server computer system, includes multiple processing units all coupled to a system interconnect, which typically comprises one or more address, data, and control buses. Coupled to the system interconnect is a system memory, which represents the lowest level of shared memory in the multiprocessor computer system and which generally is accessible for read and write access by all processing units. In order to reduce access latency to instructions and data residing in the system memory, each processing unit is typically further supported by a respective multi-level vertical cache hierarchy, the lower level(s) of which may be shared by one or more processor cores.

Many conventional SMP computer system support atomic memory operations (AMOs), which enable a processing element to atomically read, modify, and write a data granule without any intervening access to the data granule by another processing element. Common types of AMOs include Fetch-and-Add, Compare-and-Swap, Test-and-Set, and various types of logical operations.

BRIEF SUMMARY

Some prior art SMP computer systems support AMOs by including in the cache hierarchy of an associated processor core an arithmetic logic unit (ALU) that performs the AMOs specified by requests of the associated processor core. Other prior art SMP computer systems alternatively implement an ALU in the memory controller of the system memory. Performing AMOs in-cache has the advantage of relatively lower latency, given the significantly lower access latency of cache memory versus the memory controller. Performing AMOs at the memory controller has the advantage, in high demand cases, of greater throughput. This advantage can arise because the throughput of a sequence of AMOs in a system that services AMOs in-cache will be limited by the time required for cache-to-cache intervention of the target cache lines of the AMOs. However, prior art systems do not permit any control of where AMOs are performed.

In accordance with at least one embodiment, a data processing system supports selectively performing AMOs either at a cache memory of the data processing system or at a memory controller of the data processing system.

In at least one embodiment, a data processing system includes at least one processing unit and memory controller coupled to a system memory. The processing unit includes a processor core and a cache memory including an arithmetic logic unit (ALU). The cache memory is configured to receive, from the processor core, an atomic memory operation (AMO) request specifying a target address of a data granule to be updated by an AMO and a location indication. Based on the location indication having a first setting, the AMO indicated by the AMO request is performed in the cache memory utilizing the ALU. Based on the location indication having a different second setting, the cache memory issues the AMO request to the memory controller to cause the AMO to be performed at the memory controller.

In at least some embodiments, the location indication within the AMO request is based on a corresponding setting of an AMO instruction that is executed to generate the AMO request. It should be noted that having the ability to specify the location at which the AMO is to be performed in the AMO instruction does not require implementation of ALUs in both the cache memory and the memory controller in order to support such execution of such AMO instructions. If a given architecture lacks an ALU to perform the AMO in the indicated location, the location indicated by the AMO instruction and corresponding AMO request can simply be ignored.

DETAILED DESCRIPTION

Figure 1:
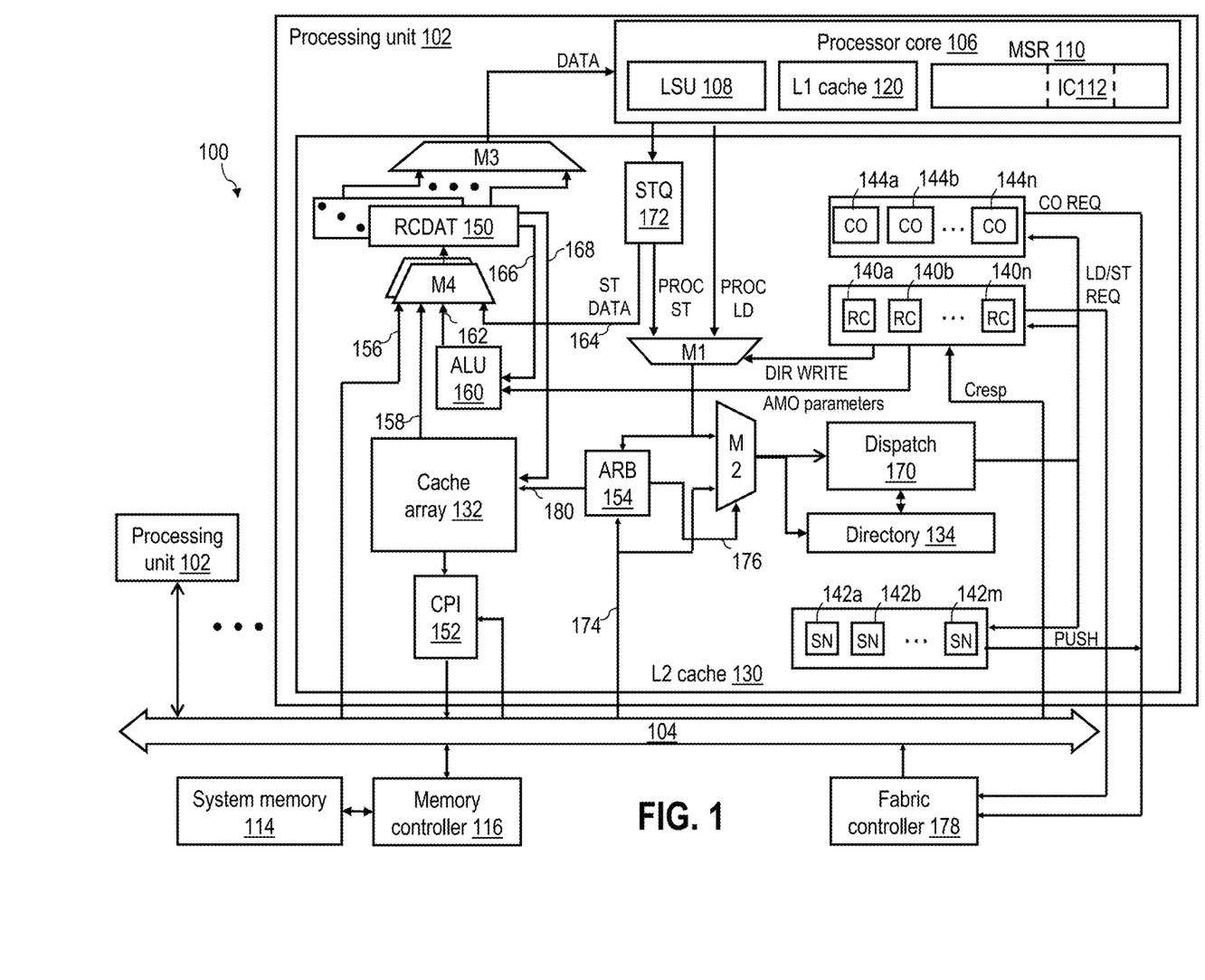
FIG. 1 is a diagram of a relevant portion of a data processing system in accordance with one embodiment.

With reference now to the figures and, in particular, with reference to FIG. 1, there is illustrated a high level block diagram of an exemplary data processing system 100 in accordance with the present invention. Data processing unit 100 includes multiple processing units 102, which are coupled for communication by an interconnect 104. In various embodiments, interconnect 104 may include on or more buses and/or switches conveying address, data, coherence, and control information.

In the depicted embodiment, each processing unit 102 is a single integrated circuit including at least one processor core 106 for processing instructions and data. Each processor core 106 includes an instruction sequencing unit (not illustrated) for fetching and ordering instructions for execution, as well as one or more execution units for executing instructions. For example, these execution units may include at least a floating-point unit (FPU) (not shown), integer unit (IU) (not shown), and load-store unit (LSU) 108. The instructions executed by LSU 108 include memory access instructions, including AMO instructions, that request read and/or write access to various memory blocks. In a preferred embodiment, processor core 106 supports simultaneous multithreading (SMT) and consequently supports concurrent execution of instructions in a plurality of hardware threads of execution.

Processor core 106 additionally includes one or more registers for storing data, instructions, and control information. In this example, these registers include a machine state register (MSR) 110, which is a software-accessible register that reports and controls the state of processor core 106. In typical embodiments, MSR 110 includes multiple fields, which may control, among other things, interrupt modes, tracing modes, use of little-Endian or big-Endian bit ordering, etc. In at least one embodiment described further herein, MSR 110 includes an in-cache (IC) flag 112, which can be utilized to control the location at which AMOs are performed, as discussed further below with reference to FIGS. 3B-3C and 4B.

The operation of processor core 106 is supported by a multi-level memory hierarchy having at its lowest level one or more shared system memories 114 (only one of which is explicitly shown in FIG. 1) and, at its upper levels, a vertical cache memory hierarchy including one or more levels of cache memory. As depicted, system memory 114 is accessed via a memory controller 116 coupled to system interconnect 104. In alternative embodiments, a memory controller 116 can be integrated into one or more of processing units 102.

In the illustrative embodiment, the vertical cache memory hierarchy of processing unit 102 includes a store-through level one (L1) cache 120 within processor core 106 and a store-in level two (L2) cache 130. Although the illustrated cache hierarchy includes only two levels of cache memory, those skilled in the art will appreciate that alternative embodiments may include additional levels (e.g., level three (L3), level four (L4), etc.) of on-chip or off-chip in-line or look-aside cache, which may be fully inclusive, partially inclusive, or non-inclusive of the contents the upper levels of cache.

Still referring to FIG. 1, L2 cache 130 includes a cache array 132 and a directory 134 of the contents of cache array 132. Assuming cache array 132 and directory 134 are set-associative as is conventional, memory locations in system memory 114 are mapped to particular congruence classes within cache array 132 utilizing predetermined index bits within the system memory (real) addresses. The particular memory blocks stored within the cache lines of cache array 132 are recorded in cache directory 134, which contains one directory entry for each cache line. While not expressly depicted in FIG. 1, it will be understood by those skilled in the art that each directory entry in cache directory 134 includes various fields, for example, a tag field that identifies the real address of the memory block held in the corresponding cache line of cache array 132, a state field that indicate the coherence state of the cache line, and a replacement order field indicating a replacement order for the cache line with respect to other cache lines in the same congruence class.

L2 cache 130 includes multiple (e.g., 16 or 32) read-claim (RC) machines 140a-140n, which are state machines for independently and concurrently servicing memory access requests received from the associated processor core 106. RC machines 140 are coupled to an arithmetic logic unit 160, which is configured to perform various types of arithmetic and logical read-modify-write operations under the control of RC machines 140. L2 cache 130 also includes multiple (e.g., 16 or 32) snoop (SN) machines 142a-142m, which are state machines configured to service remote memory access requests snooped on interconnect 104. As will be appreciated, the servicing of memory access requests by L2 cache 130 may require the replacement or invalidation of memory blocks within cache array 132. Accordingly, L2 cache 130 additionally includes castout (CO) machines 144a-144n that manage the removal and writeback of memory blocks from cache array 132.

L2 cache 110 also includes RCDAT buffers 150 and a CPI (castout push intervention) queue 152 that respectively buffer data being inserted into and removed from the cache array 132. CPI queue 152 includes a number of buffer entries that each individually correspond to a particular one of the castout machines 144 and snoop machines 142, such that each CO machine 144 and each snoop machine 142 that is dispatched utilizes only the respective designated entry in CPI queue 152. Similarly, RCDAT buffers 150 include a number of buffer entries that each individually correspond to a particular one of RC machines 140 such that each RC machine 140 that is dispatched retrieves data from only the designated RCDAT buffer 150. At least some of RCDAT buffers 150 have an associated store data multiplexer M4 that selects data bytes from among its inputs for buffering in the RCDAT buffer 150 in response to unillustrated select signals generated by an arbiter 154. In the depicted embodiment, the inputs to a multiplexer M4 are coupled to a reload bus 156 that receives data from interconnect 104, an array data path 158 that conveys a cache line of data read out of cache array 132, an arithmetic logic unit (ALU) data path 162 that conveys data output from ALU 160, and a core data path 164 that conveys store data from the associated processor core 106. Data buffered in an RCDAT buffer 150 can be output to processor core 106 via multiplexer M3 (which selects among RCDAT buffers 150), can be output to ALU 160 via data path 166, or can be written into cache array 132 via data path 168.

Arbiter 154 is configured to control a pair of multiplexers M1-M2 to order the processing of local memory access requests received from the affiliated processor core 106 and remote requests snooped on interconnect 104. Memory access requests, including both local memory access requests and remote memory access requests snooped on interconnect 104, are forwarded in accordance with the arbitration policy implemented by arbiter 154 to a dispatch pipeline 170 in which each such memory access request is processed with respect to directory 134 and cache array 132 over a given number of cycles.

In operation, processor store-type requests comprising a transaction type (ttype), target real address, and store data are received from the affiliated processor core 106 within a store queue (STQ) 172. From STQ 172, the store data are transmitted to a store data multiplexer M4 via data path 164, and the store-type request and target address are passed to multiplexer M1. Multiplexer M1 also receives as inputs processor load-type requests from processor core 106 and directory write requests from RC machines 140. In response to unillustrated select signals generated by arbiter 154, multiplexer M1 selects one of its input requests to forward to multiplexer M2, which additionally receives as an input a remote request received from interconnect 104 via remote request path 174. Arbiter 154 schedules local and remote memory access requests for processing and, based upon the scheduling, generates a set of select signals 176. In response to select signals 176, multiplexer M2 selects either the local request received from multiplexer M1 or the remote request snooped from interconnect 104 as the next memory access request to be processed.

A request selected for processing by arbiter 154 is placed by multiplexer M2 into dispatch pipeline 170. Dispatch pipeline 170 preferably is implemented as a fixed duration pipeline in which each of multiple possible overlapping requests is processed for a predetermined number of clock cycles. For example, dispatch pipeline 170 may process each request for four cycles.

During a first cycle of processing within dispatch pipeline 170, a 1-cycle directory read is performed utilizing the request address to determine if the target address of the memory access request hits or misses in directory 134, and if the target address hits, the coherence state of the memory block within directory 132. The directory information, which includes a hit/miss indication and the coherence state of the memory block, is returned by directory 134 to dispatch pipeline 170 in a subsequent cycle, such as the fourth cycle. As will be appreciated, no action is generally taken within L2 cache 130 in response to miss on a remote memory access request; such remote memory requests are accordingly discarded from dispatch pipeline 170. However, in the event of a hit or miss on a local memory access request or a hit on a remote memory access request, L2 cache 130 will service the memory access request, which for requests that cannot be serviced entirely within processing unit 102, may entail communication on interconnect 104 via fabric controller 178.

At a predetermined time during processing of the memory access request within dispatch pipeline 170, arbiter 154 transmits the target address of a memory access that hit in directory 134 to cache array 132 via address and control path 180 to initiate a cache read of the memory block specified by the target address. A cache read takes 2 cycles in the exemplary embodiment. The memory block read from cache array 132 is transmitted to the relevant RCDAT buffer 150 via array data path 158 and multiplexer M4. For processor load requests, the memory block is also transmitted via load data multiplexer M3 for forwarding to the associated processor core 106.

At the last cycle of the processing of a memory access request within dispatch pipeline 170, dispatch pipeline 170 make a dispatch determination. For example, dispatch pipeline 170 may make the dispatch determination based upon a number of criteria, including (1) the presence of an address collision between the target address and a previous target address currently being processed by a RC machine 140, snoop machine 142, or castout machine 144, (2) the directory information, and (3) availability of an RC machine 140 (for a local request of the affiliated processor core 106) or snoop machine 142 (for a snooped request of a remote processor core) to process the memory access request. If dispatch pipeline 170 makes a dispatch determination that the memory access request is to be dispatched, the memory access request is dispatched from dispatch pipeline 170 to an RC machine 140 or a snoop machine 142, as appropriate. If the memory access request fails dispatch, the failure is signaled to the requestor (e.g., local or remote processor core 106) by a retry response. The requestor may subsequently retry the failed memory access request, if necessary.

While an RC machine 140 is processing a local memory access request, the RC machine 140 has a busy status and is not available to service another request. While an RC machine 140 has a busy status, the RC machine 140 may perform a directory write to update the relevant entry of directory 134, if necessary. In addition, the RC machine 140 may perform a cache write to update the relevant cache line of cache array 132. A directory write and a cache write may be scheduled by arbiter 154 during any interval in which dispatch pipeline 170 is not already processing other requests according to the fixed scheduling of directory reads and cache reads. (It will be appreciated that the scheduling of non-fixed-schedule operations such as directory writes and cache writes can impact the scheduling of other operations, including those processed according to a fixed schedule.) When all operations for the given request have been completed, the RC machine 140 returns to an unbusy state.

Figure 2:
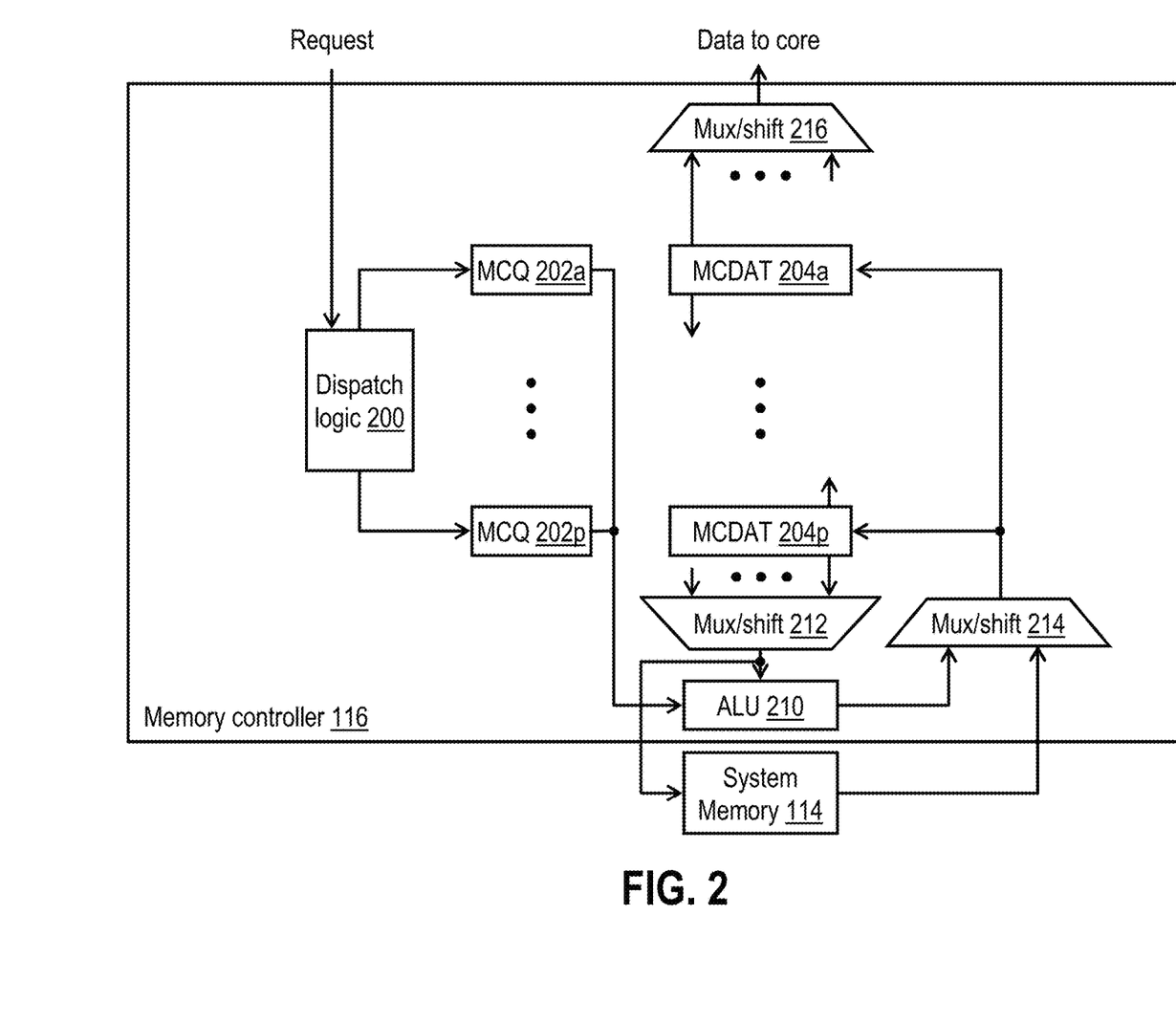
FIG. 2 is a more detailed block diagram of a memory controller in accordance with one embodiment.

Referring now to FIG. 2, there is depicted a more detailed block diagram of a memory controller 116 in accordance with one embodiment. Memory controller 116 includes dispatch logic 200 that receives memory access requests of processing units 102 via interconnect 104. Such memory access requests may include, for example, a request type, a target real memory address, and, for store-type requests, store data. Dispatch logic 200 is coupled to a plurality of memory controller queues (MCQs) 202a-202p, which are state machines that can independently and concurrently service memory access requests assigned to them by dispatch logic 200. Each MCQ 202 has an associated one of memory controller data (MCDAT) buffers 204a-204p for buffering data.

MCQs 202 are coupled to an ALU 210, which is configured to perform various types of arithmetic and logical read-modify-write operations within memory controller 116 under the control of MCQs 202. The data bytes operated upon by ALU 210 are selected from MCDAT buffers 204 by a first multiplexer (mux)/shifter 212, which has a plurality of inputs, each of which is coupled to a respective one of MCDAT buffers 204. The output of first mux/shifter 212 is also coupled to system memory 114 in order to permit data to be written into system memory 114 by MCQ 202.

System memory 114 and ALU 210 are further coupled to a second mux/shifter 214, which has an output coupled to each of MDCAT buffers 204 in order to permit data modified by ALU 210 and data accessed from system memory 114 to be buffered within MCDAT buffers 204. Each of MCDAT buffers 204 is further coupled to a respective input of a third mux/shifter 216, which has an output coupled to interconnect 104 in order to permit data requested from system memory 114 to be returned to processor core 106.

Figure 3A:
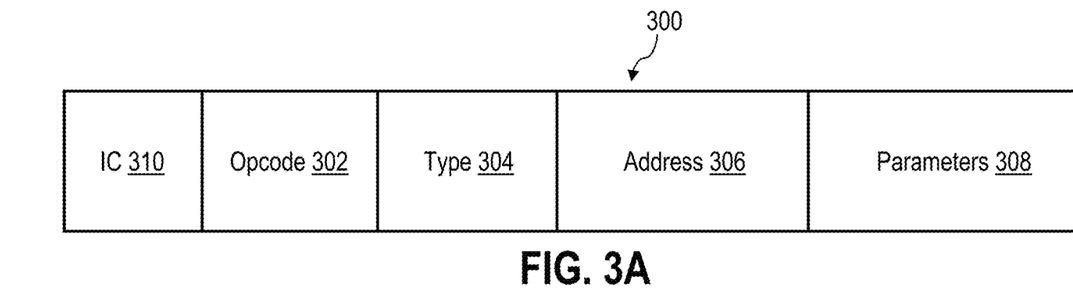
FIG. 3A illustrates an exemplary AMO instruction in accordance with a first embodiment.

With reference now to FIG. 3A, there is illustrated an exemplary AMO instruction 300 in accordance with a first embodiment. In the first embodiment, AMO instruction 300 directly specifies whether the indicated AMO is to be performed within L2 cache 130 or within memory controller 116.

In the first embodiment, AMO instruction 300 includes an opcode field 302, which specifies an architecture-dependent operation code indicating that an atomic memory operation is to be performed. The specific type of AMO to be performed is further indicated in a type field 304 of AMO instruction 300. Common types of AMOs include Fetch-and-Add, Compare-and-Swap, Test-and-Set, addition, subtraction, and various types of logical operations. Those skilled in the art will recognize will recognize that the information in fields 302 and 304 can be merged into a single field in some embodiments. AMO instruction 300 additionally includes an address field 306 indicating the target real address of the data to be operated upon by the AMO. In general, address 306 will include identifiers of one or more registers containing the relevant address information. Additional type-dependent parameters of the AMO can be specified in a parameters field 308. AMO instruction 300 finally includes an in-cache (IC) field 310 having multiple possible alternative settings. In one example, a setting of "1" indicates that the AMO operation identified by type field 304 is to be performed in L2 cache 130, and a setting of "0" indicates that the AMO operation is instead to be performed at memory controller 116. Those skilled in the art will appreciate that these two different options are subject to various advantages and performance tradeoffs. In general, AMOs can be performed at L2 cache 130 at a lower latency, but with possibly lower throughput; AMOs can be performed at memory controller 116 at a relatively higher latency, but with higher throughput in cases of significant load.

Figure 4A:
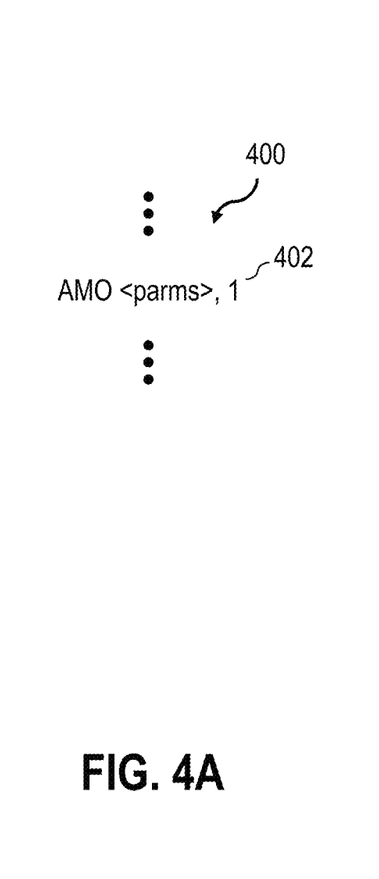
FIG. 4A depicts an exemplary AMO instruction sequence in accordance with the first embodiment.

FIG. 4A depicts an exemplary AMO instruction sequence 400 in accordance with the first embodiment. In this example, AMO instruction sequence 400 includes an AMO instruction 402, which may be preceded and followed by any number of desired instructions. As explicitly shown in FIG. 4A, AMO instruction 402 specifies via an IC field 310 having a value of "1" that the AMO is to be performed in the L2 cache 130 associated with the executing processor core 106.

Figure 3B:
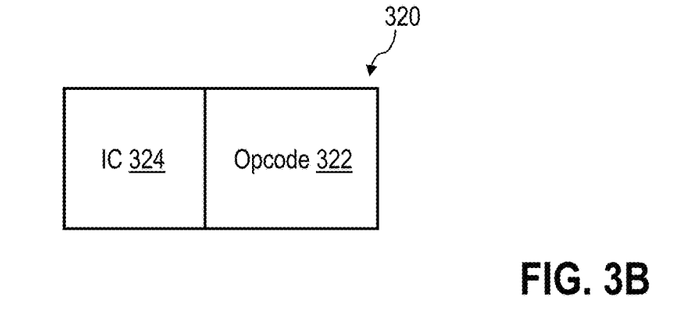
FIG. 3B depicts an exemplary register-setting instruction in accordance with a second embodiment.
Figure 3C:
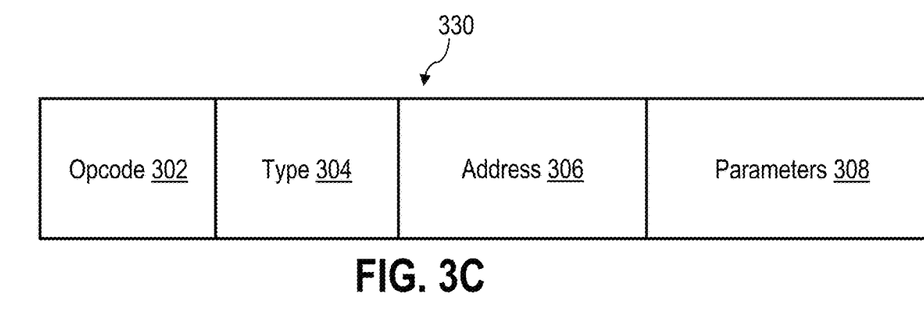
FIG. 3C illustrates an exemplary AMO instruction in accordance with the second embodiment.

In a second embodiment, given in FIGS. 3B-3C, the location at which an AMO is performed can be specified in a register rather than directly in an AMO instruction. For example, in the exemplary data processing system 100 of FIG. 1, the location at which AMOs are performed for a given processor core 106 can be specified by IC field 112 of MSR 110. Again, a setting of "1" in IC field 112 can be utilized to indicate that an AMO operation is to be performed in L2 cache 130, and a setting of "0" can be utilized to indicate that the AMO operation is instead to be performed at memory controller 116.

In this second embodiment, a register-setting instruction 320 as shown in FIG. 3B can be utilized to set IC field 112 of MSR 110 to a desired setting. In this example, register-setting instruction 320 includes an opcode field 322 specifying an architecture-dependent operation code indicating that a field of MSR 110 (in this case, IC field 112) is to be set. Register setting instruction 320 additionally includes an IC field 324 having multiple possible alternative settings. Execution of AMO location selection instruction 320 causes a setting corresponding to that in IC field 324 to be established in IC field 112 of MSR 110.

In the second embodiment, an AMO may be specified utilizing an AMO instruction 330 as shown in FIG. 3C. As indicated by like reference numerals, AMO instruction 330 may be identical to AMO instruction 300, except that AMO instruction 330 lacks any field corresponding to IC field 310, given that the location at which the AMO is performed is governed by IC field 112 in MSR 110 rather than directly specified in AMO instruction 330 itself.

Figure 4B:
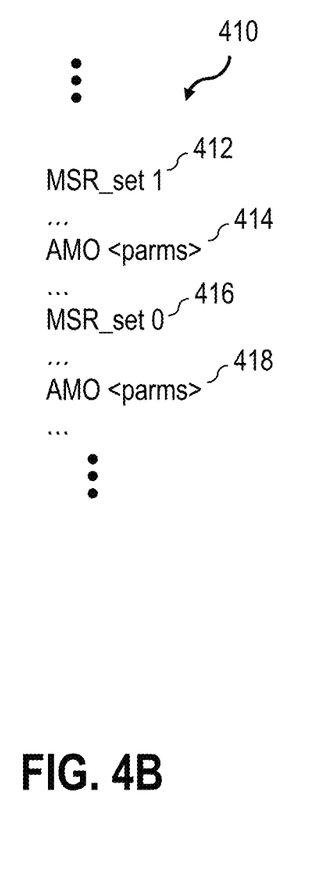
FIG. 4B depicts an exemplary AMO instruction sequence in accordance with the second embodiment.

FIG. 4B depicts an exemplary AMO instruction sequence 410 in accordance with the second embodiment. In this example, AMO instruction sequence 410 begins with a first register-setting instruction 412, which sets IC field 112 in MSR 110 to a value of "1." Register-setting instruction 412 is followed in program order by an AMO instruction 414. Based on the setting of IC field 112 in MSR 110 established by register-setting instruction 412, the AMO specified by AMO instruction 414 is performed in the L2 cache 130 associated with the executing processor core 106, rather than in memory controller 116. AMO instruction 414 is followed in program order by a second register-setting instruction 416, which as indicated, sets IC field 112 in MSR 110 to a value of "0." Consequently, when an AMO instruction 418 that follows register-setting instruction 416 in program order is executed, the AMO specified by AMO instruction 418 is performed at memory controller 116 rather than in-cache.

Figure 5A:
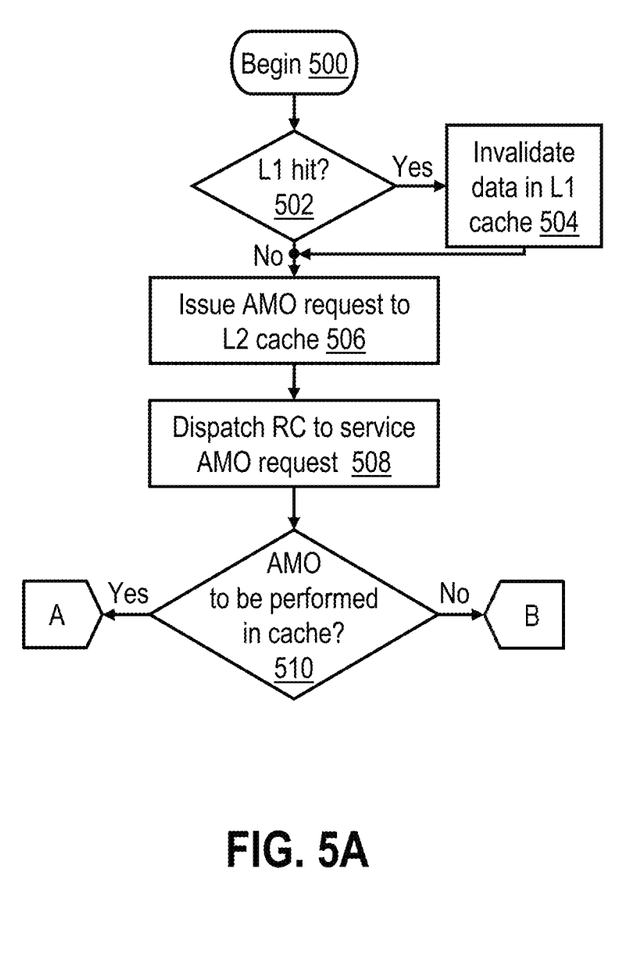
FIGS. 5A-5B together form a high level logical flowchart of the processing performed at a cache memory to selectively perform an AMO at either a cache memory or a memory controller of a data processing system.
Figure 5B:
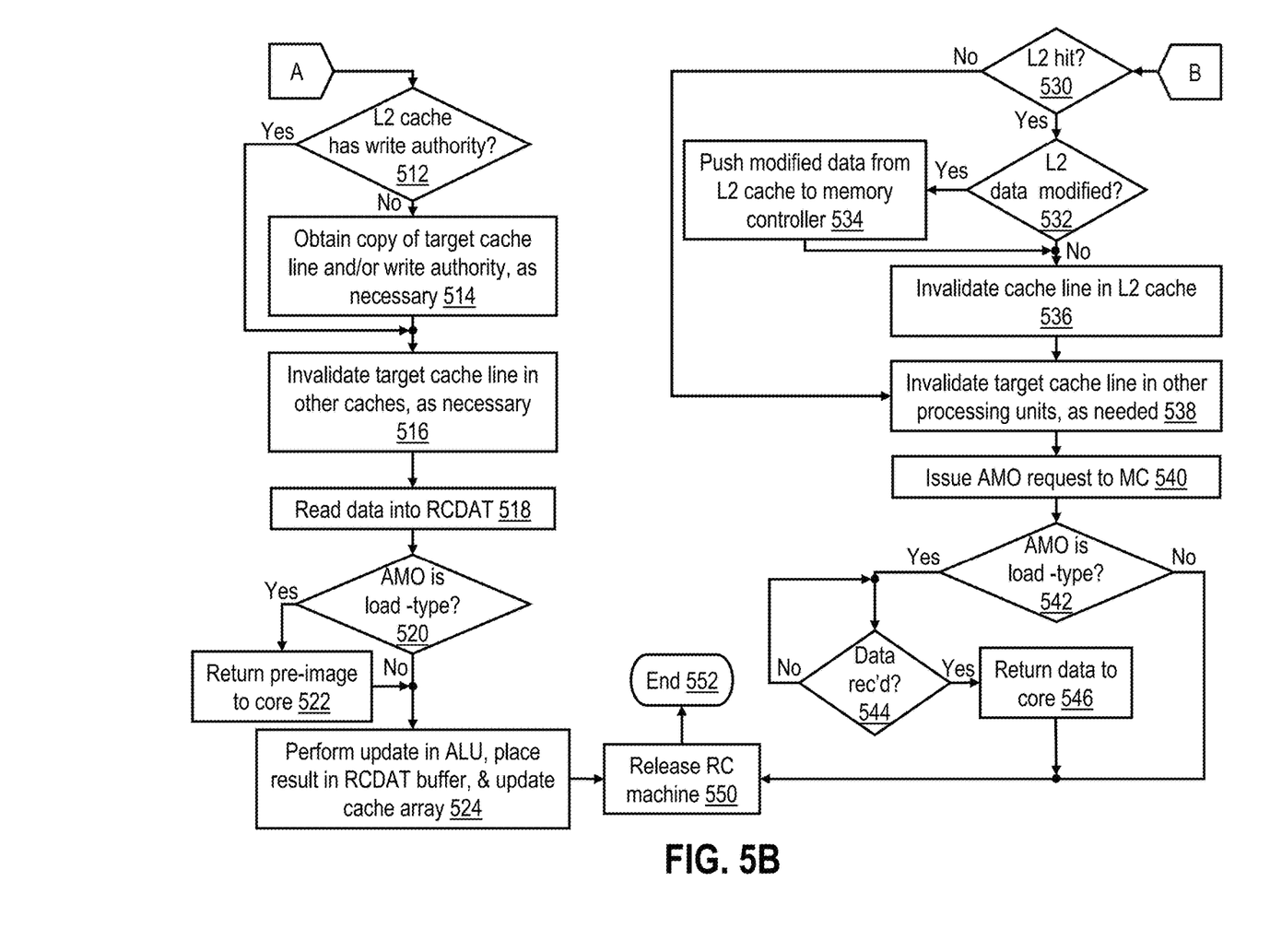

With reference now to FIGS. 5A-5B, there is illustrated a high level logical flowchart of an exemplary method of the processing performed at a cache memory to selectively perform an AMO at either a cache memory or a memory controller of a data processing system in accordance with one or more embodiments.

The process of FIG. 5A begins at block 500 in response to execution of an AMO instruction 300 or 330 by the LSU 108 of a processor core 106. In response to execution of the AMO instruction 330 or 330, LSU 108 calculates a target address of the target data granule to be operated upon by the AMO and generates an AMO request. The AMO request includes, for example, a type field corresponding to type field 304, the target address, an indication of the value of IC field 310 or 112, and, optionally, one or more parameters. A lookup of the target address of the AMO request is then performed in L1 cache 120. As indicated at blocks 502-504, if the target address hits in L1 cache 120, L1 cache 120 invalidates its copy of the cache line containing the target data granule. This invalidation is performed because, in the exemplary architecture depicted in FIG. 1, coherence is determined at L2 cache 130, and the AMO must operate on the most up-to-date copy of the target data granule. Processor core 106 then issues the AMO request to L2 cache 130 (block 506). Because the AMO is a read-modify-write operation involving both a load operation and a store operation, processor core 106 and L2 cache 130 preferably coordinate to preserve intra-thread and cross-thread ordering of the AMO request relative to both load-type and store-type requests.

In response to receipt of the AMO request, dispatch logic 170 of L2 cache 130 dispatches a free RC machine 140 to service the AMO request (block 508). At block 510, the RC machine 140 determines whether or not the AMO request indicates that the AMO is to be performed in L2 cache 130. If so, the process proceeds from block 510 via page connector A to block 512 and following blocks of FIG. 5B. If, on the other hand, the AMO request indicates that the AMO is to be performed at memory controller 116, the process proceeds from block 510 via page connector B to block 530 and following blocks of FIG. 5B.

Referring now to block 512 of FIG. 5B, the dispatched RC machine 140 determines by reference to directory information obtained by the lookup of the target address in directory 134 whether or not the coherence state of the cache line containing the target data granule indicates that the L2 cache 130 has write authority for the cache line, that is, that the coherence state indicates that L2 cache 130 holds a valid copy of the cache line and does not need to obtain permission from another coherence participant to update the cache line. If so, the process passes directly to block 516. If, however, L2 cache 130 does not have write authority for the cache line, the RC machine 140 issues one or more requests on interconnect 104 to obtain a copy of the cache line and/or write authority for the cache line, as required (block 514). This communication on interconnect 104 is subject to significant communication latency in large scale systems and thus provides motivation for instead performing AMOs at memory controller 116 if a sequence of multiple AMOs are to be performed. Following block 514, the process passes to block 516.

Block 516 depicts the RC machine 140 invalidating each other cached copy of the cache line containing the target data granule, if any. At block 518, RC machine 140 reads the cache line containing the target data granule from cache array 132 to its RCDAT buffer 150 via array data path 158 and multiplexer M4. As indicated at blocks 520-522, if the AMO is a load-type AMO that requests a copy of target data granule, RC machine 140 causes a pre-image (i.e., un-updated copy) of the target data granule to be returned to processor core 106 from RCDAT buffer 150 via multiplexer M3. Thereafter, RC machine 140 supplies ALU 160 any parameters of the AMO and causes ALU 160 to perform the AMO on the target memory granule in the RCDAT buffer 150 (block 524). The result of the AMO is written by ALU 160 back into the RCDAT buffer 150 via ALU data path 162. From RCDAT buffer 150, the modified data is then written from RCDAT buffer 150 into cache array 132 via data path 168. Following block 524, the RC machine 140 allocated to perform the AMO is released to return to the idle state (block 550), and the process of FIG. 5B ends at block 552.

Referring now to block 530 of FIG. 5B, for an AMO request that is to be serviced at memory controller 116, RC machine 140 determines from the directory information whether or not the target address of the AMO request hit in directory 134. If not, the process proceeds directly to block 538. If, however, RC machine 140 determines at block 530 that the target address of the AMO request hit in directory 134, RC machine 140 pushes the modified cache line containing the target data granule of the AMO request to memory controller 116 (blocks 532-534) and then updates directory 134 to invalidate its local copy of the cache line containing the target data granule (block 536). At block 538, the RC machine 140 also invalidates each other cached copy of the cache line containing the target data granule, if any, including in all other L1 caches 120 and L2 caches 130.

At block 540, RC machine 140 issues the AMO request to memory controller 116 via interconnect 104. As indicated at block 542, if the AMO request is not a load-type request for which data must be returned to the initiating processor core, once the AMO request is accepted by memory controller 116, servicing of the AMO request by RC machine 140 is complete. Consequently, the process passes from block 542 directly to block 550. If, however, the AMO request is a load-type request, RC machine 140 remains busy with the AMO request until the target data granule is returned by memory controller 116 (block 544) and then forwarded to the initiating processor core 106 (block 546). Thereafter, the RC machine 140 is released and returns to an idle state (block 550), and the process of FIG. 5B ends at block 552.

Figure 6:
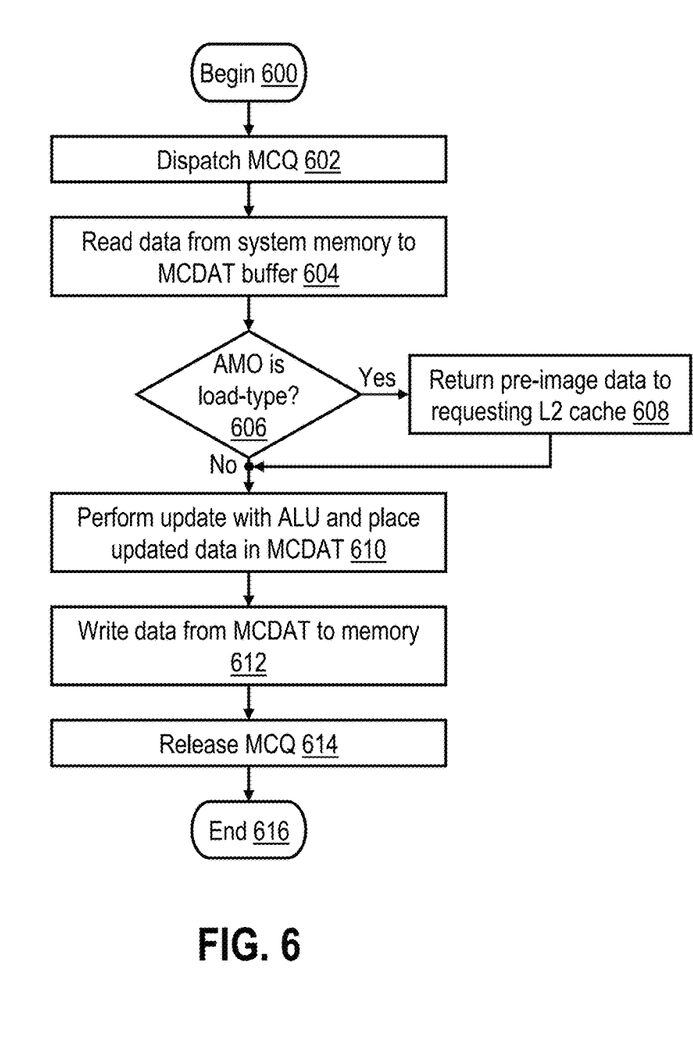
FIG. 6 is a high level logical flowchart of the processing performed at a memory controller of a data processing system to selectively perform an AMO at the memory controller.

Referring now to FIG. 6, there is depicted a high level logical flowchart of the processing performed at a memory controller of a data processing system to selectively perform an AMO at the memory controller. The process of FIG. 6 begins at block 600, for example, in response to receipt by dispatch logic 200 of an AMO request issued on interconnect 104 at block 540 of FIG. 5B. In response to receipt of the AMO request, dispatch logic 200 dispatches an available MCQ 202 to service the AMO request (block 602). The MCQ 202 then reads the memory block containing the target data granule of the AMO request from system memory 114 into its associated MCDAT buffer 204 (block 604). As indicated at blocks 606-608, if the AMO is a load-type AMO that requests a copy of target data granule, MCQ 202 causes a pre-image (i.e., un-updated copy) of the memory block containing the target data granule to be returned to the requesting L2 cache 130 from MCDAT buffer 204 via mux/shifter 216. This pre-image of the memory block is awaited by the requesting L2 cache 130 at block 544 of FIG. 5B.

Thereafter, MCQ 202 supplies ALU 210 with any necessary parameters of the AMO and causes ALU 210 to perform the AMO on the target memory granule in the MCDAT buffer 204 (block 610). The result of the AMO is written by ALU 210 back into the MCDAT buffer 204 via mux/shifter 214. From MCDAT buffer 204, the modified data is then written into system memory 114 via mux/shifter 212 (block 612). Following block 612, the MCQ 202 allocated to perform the AMO is released to return to the idle state (block 614), and the process of FIG. 6 ends at block 616.

Figure 7:
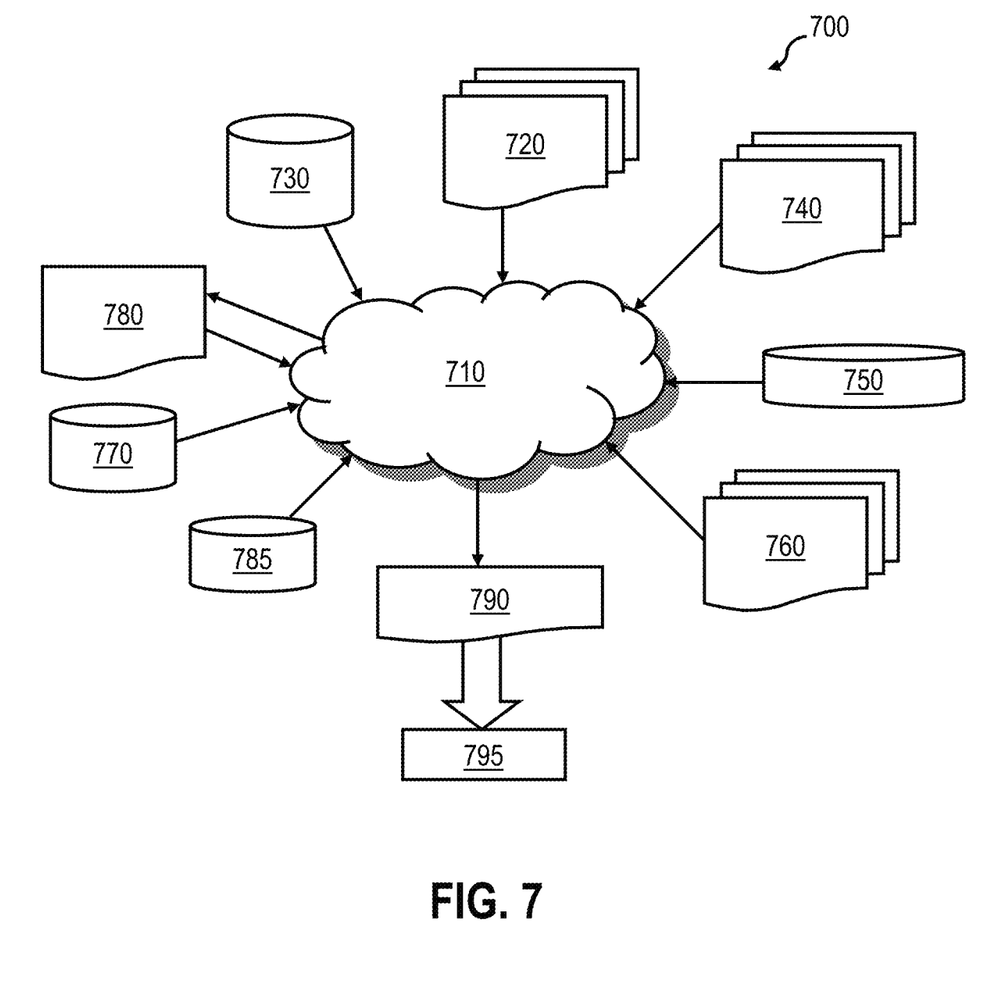
FIG. 7 illustrates an exemplary design process in accordance with one embodiment.

With reference now to FIG. 7, there is depicted a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of the design structures and/or devices described above and shown herein. The design structures processed and/or generated by design flow 700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 1020 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown herein. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures shown herein to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 790 may comprise a compiled, executable HDL simulation model that functionally simulates the devices shown herein.

Design structure 790 may also employ a data format used for the exchange of layout data of integrated circuits and/or symbolic data format (e.g., information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 790 may then proceed to a stage 795 where, for example, design structure 790: proceeds to tape-out, is released to manufacturing, is released to a mask house, is sent to another design house, is sent back to the customer, etc.

As has been described, in at least one embodiment, a data processing system includes at least one processing unit and a memory controller coupled to a system memory. The processing unit includes a processor core and a cache memory including an arithmetic logic unit (ALU). The cache memory is configured to receive, from the processor core, an atomic memory operation (AMO) request specifying a target address of a data granule to be updated by an AMO and a location indication. Based on the location indication having a first setting, the AMO indicated by the AMO request is performed in the cache memory utilizing the ALU. Based on the location indication having a different second setting, the cache memory issues the AMO request to the memory controller to cause the AMO to be performed at the memory controller.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a processor core, a cache memory including an arithmetic logic unit (ALU), a system memory, and a memory controller coupled to the system memory, the method comprising:
the cache memory receiving, from the processor core, a load-type atomic memory operation (AMO) request specifying a target address of a data granule to be updated by an AMO and a location indication;
based on the location indication having a first setting, the cache memory accessing and returning to the processor core an un-updated copy of the data granule to be updated by the load-type AMO request and, after returning the un-updated copy of the data granule, the cache memory performing the AMO indicated by the load-type AMO request to update the data granule in the cache memory;
based on the location indication having a different second setting:
the cache memory issuing to the memory controller the load-type AMO request,
based on receipt of the load-type AMO request, the memory controller accessing and returning to the cache memory an un-updated copy of the data granule to be updated by the load-type AMO request and, after returning the un-updated copy of the data granule, the memory controller performing the AMO indicated by the load-type AMO request to update the data granule in the system memory.

2. The method of claim 1, and further comprising:
the processor core executing an AMO instruction including a location field;
the processor core setting the location indication in the AMO request based on the location field in the AMO instruction.

3. The method of claim 1, wherein:
the processor core includes a register; and
the method further comprises the processor core setting the location indication in the AMO request based on a value of the register.

4. The method of claim 3, wherein the register is a machine state register (MSR).

5. A processing unit for a data processing system, the data processing system including a memory controller coupled to a system memory, the processing unit comprising:
a processor core;
a cache memory including an arithmetic logic unit (ALU), wherein the cache memory is coupled to the processor core and configured to perform:
receiving, from the processor core, a load-type atomic memory operation (AMO) request specifying a target address of a data granule to be updated by an AMO and a location indication;
based on the location indication having a first setting, accessing and returning to the processor core an un-updated copy of the data granule to be updated by the load-type AMO request and, after returning the un-updated copy of the data granule, performing the AMO indicated by the load-type AMO request in the cache memory utilizing the ALU to update the data granule in the cache memory;
based on the location indication having a different second setting, the cache memory issuing to the memory controller the load-type AMO request to cause the AMO to be performed at the memory controller; and
wherein the memory controller is coupled to the cache memory and the memory controller is configured, based on receipt of the load-type AMO request from the cache memory, to access and return to the cache memory an un-updated copy of the data granule to be updated by the load-type AMO request and, after returning the un-updated copy of the data granule the memory controller is configured to perform the AMO indicated by the load-type AMO request to update the data granule in the system memory.

6. The processing unit of claim 5, wherein the processor core comprises an execution unit that executes an AMO instruction including a location field and, based on the location field, the processor core sets the location indication in the AMO request.

7. The processing unit of claim 5, wherein:
the processor core includes a register; and
the processor core is configured to set the location indication in the AMO request based on a value of the register.

8. The processing unit of claim 7, wherein the register is a machine state register (MSR).

9. A multiprocessing data processing system, comprising:
a memory controller;
a system memory;
a first processing unit including:
a processor core;
a cache memory including an arithmetic logic unit (ALU), wherein the cache memory is coupled to the processor core and configured to perform;
receiving, from the processor core, a load-type atomic memory operation (AMO) request specifying a target address of a data granule to be updated by an AMO and a location indication;
based on the location indication having a first setting, accessing and returning to the processor core an un-updated copy of the data granule to be updated by the load-type AMO request and, alter returning the un-updated copy of the data granule, performing the AMO indicated by the load-type AMO request in the cache memory utilizing the ALU to update the data granule in the cache memory;
based on the location indication having a different second setting, the cache memory issuing to the memory controller the load-type AMO request to cause the AMO to be performed at the memory controller; and
wherein the memory controller is coupled to the cache memory and the system memory and the memory controller is configured, based on receipt of the load-type AMO request from the cache memory, to access and return to the cache memory an un-updated copy of the data granule to be updated by the load-type AMO request and, after returning the un-updated copy of the data granule, the memory controller is configured to perform the AMO indicated by the load-type AMO request to update the data granule in the system memory; and
wherein the first processing unit is connected to a second processing unit via an interconnect.

10. A computer program product comprising a non-transitory computer-readable storage device, the non-transitory computer-readable storage device storing program code executable by a data processing system, the data processing system including a processor core, a cache memory including an arithmetic logic unit (ALU), a system memory, and a memory controller coupled to the system memory, the program code causing the data processing system to:
  receive at the cache memory, from the processor core, a load-type atomic memory operation (AMO) request specifying a target address of a data granule to be updated by an AMO and a location indication;
  based on the location indication having a first setting, the cache memory accessing and returning to the processor core an un-updated copy of the data granule to be updated by the load-type AMO request and, after returning the un-updated copy of the data granule, the cache memory performing the AMO indicated by the load-type AMO request to update the data granule in the cache memory;
  based on the location indication having a different second setting:
    the cache memory issuing to the memory controller the load-type AMO request,
    based on receipt of the load-type AMO request, the memory controller accessing and returning to the cache memory an un-updated copy of the data granule to be updated by the load-type AMO request and, after returning the un-updated copy of the data granule, the memory controller performing the AMO indicated by the load-type AMO request to update the data granule in the system memory.

11. The computer program product of claim 10, wherein the program code further causes the processor core to execute an AMO instruction including a location field and, based on the location field, the processor core sets the location indication in the AMO request.

12. The computer program product of claim 10, wherein:
  the processor core includes a register; and
  the program code further causes the processor core to set the location indication in the AMO request based on a value of the register.

13. The computer program product of claim 12, wherein the register is a machine state register (MSR).

* * * * *